United States Patent [19]
Cummings

[11] 3,722,700
[45] Mar. 27, 1973

[54] SHELF
[75] Inventor: Gilbert A. Cummings, Norwell, Mass.
[73] Assignee: Peters & Co., Inc., Boston, Mass.
[22] Filed: Apr. 26, 1971
[21] Appl. No.: 137,122

[52] U.S. Cl..............211/153, 248/345.1, 280/79.3
[51] Int. Cl.......A47b 95/00, A47b 96/02, B62b 5/00
[58] Field of Search.............211/153, 135, 134, 148; 248/345.1; 52/36; 220/71-74; 280/79.3, 79.2, 79.1

[56] References Cited

UNITED STATES PATENTS

| | | | |
|---|---|---|---|
| 1,935,718 | 11/1933 | Johnson | 248/345.1 |
| 2,225,110 | 12/1940 | Hearn | 220/73 X |
| 2,685,147 | 8/1954 | Burr | 248/345.1 |
| 2,830,825 | 4/1958 | Webber et al. | 280/79.3 |
| 3,065,860 | 11/1962 | Swanson | 211/153 |
| 3,129,841 | 4/1964 | Loewenthal et al. | 220/73 X |

*Primary Examiner*—Ramon S. Britts
*Attorney*—John Noel Williams

[57] ABSTRACT

Shelf suitable for portable food service carts and manufacturable from sheet metal, forms a corner opening by foreshortening of side skirts while an elastomeric corner member filling the opening has a protruding bumper portion and leg surfaces along the inner surfaces of the side skirts. Features include inward lower flanges forming "C" shaped channels enclosing portions of the elastomeric corner member; welding of the flanges, bracing the side skirts; the elastomeric corner member under compression, urging the leg surfaces against the skirts; butting of the corner member against the ends of the foreshortened skirts; entire shelf formed of a single sheet of metal, providing a pair of horizontal positioning surfaces for the corner member; and the top of the corner member filling a corner cut-out in the top surface.

7 Claims, 21 Drawing Figures

3,722,700
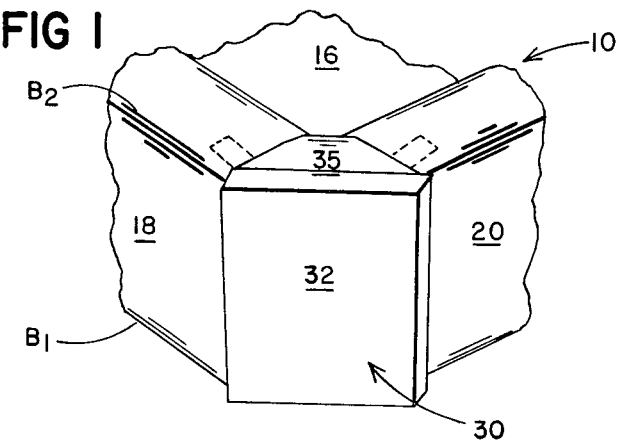
FIG 1
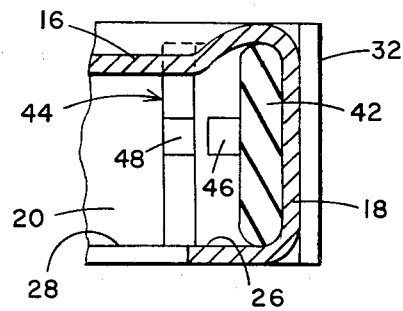
FIG 2
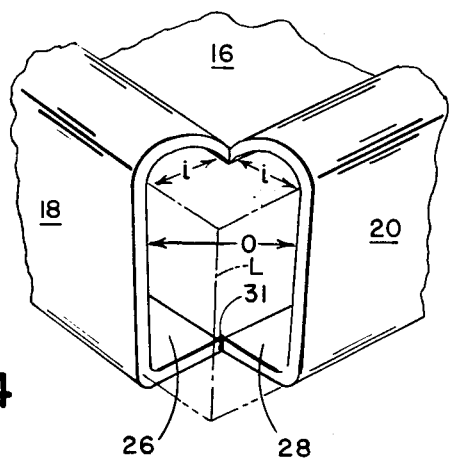
FIG 4
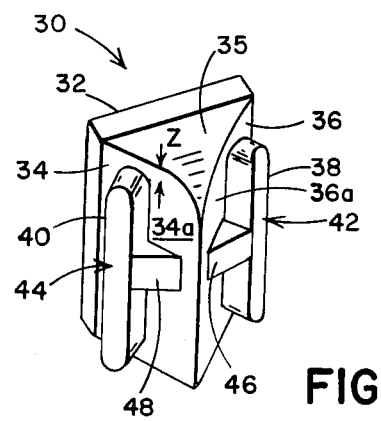
FIG 3
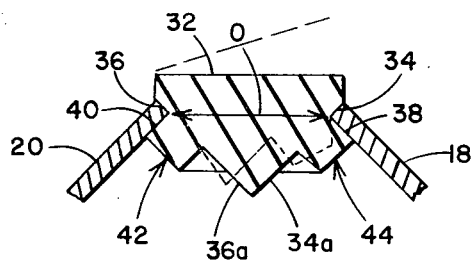
FIG 5
FIG 5a
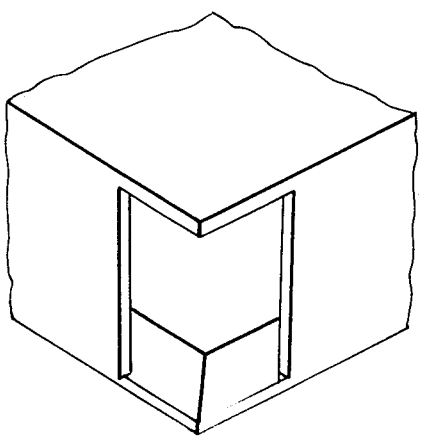
FIG 8
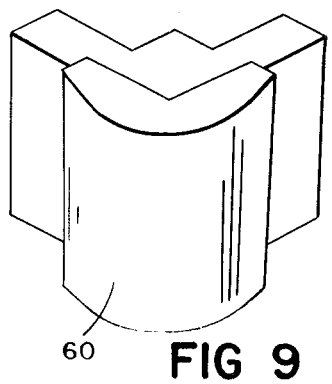
FIG 9
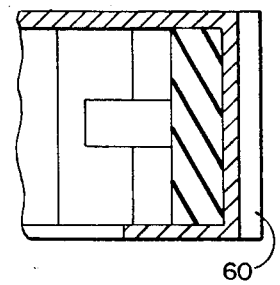
FIG 10

SHELF

This invention concerns a metal shelf construction useful for carts in food service and the like, the objects of the invention being to simplify construction of such shelves, and in general to provide an improved shelf construction from the point of view of cost and function. Commonly the corners for shelves of the sort here involved are fully welded, ground and polished. According to the invention this welding, grinding and polishing are avoided and at the same time a corner bumper is provided.

According to one aspect of the invention a shelf has a corner defined by an elastomeric corner member. The shelf comprises a top and a pair of side skirts, one extending along each of two adjacent sides of the top. Each side skirt is foreshortened, terminating at a position short of the projected intersection of the pair of side skirts, this foreshortening defining a corner opening. An elastomeric corner member, associated with the corner, has a protruding bumper portion at the corner and two positioning leg surfaces, one extending generally parallel to each of the side skirts along the inner surface of the side skirts.

Preferred embodiments feature the entire shelf excepting the corner member formed of a single, integral piece of sheet metal; a pair of horizontal surfaces along each skirt positioning the corner member vertically; a lower flange along each skirt forming with the skirt and a top channel enclosing portions of the corner member that define the leg surfaces; lower flanges welded together locally to brace the side skirts; portions of the corner member under compression, urging the leg surfaces against the inner surfaces of the side skirt; the protruding bumper portion having portions exposed to butt against the ends of the foreshortened skirt; and a cut-out in the corner of the top filled by an upper portion of the corner member.

The invention also enables an elastomeric corner member to be inserted into the open corner without the use of special tools, yet to be designed so that it is not removable during normal operation of a shelf such as when bumped against a wall or an object, and is still readily removable without special tools and replaced after it is worn.

The shelf itself is preferably formed of stainless steel sheeting in which the corners are notched to provide a space in which the corner bumper fits.

The cross section of the edge of the shelf could be of many configurations while employing features mentioned above. The bottom edge can be returned to form a flange or it can be simply folded over and flattened or it can be returned, then folded over and flattened. The top edge can be a simple roll or a square. Many configurations of the shelf are possible, featuring the closing of a corner which normally would have to be of welded construction.

In the preferred form, the bottom edge of the shelf returns, providing two C-shaped channels shown at 90° to one another. The corner member then fits into those channels, this corner member being a rubber bumper which closes the juncture of the two channels. Preferably it has portions which frictionally engage the two C-shaped channels, preferably the portions being legs that extend into the channels. These legs are compressed toward each other during insertion and once inserted the legs are in a compressed state pressing hard against the side of the channels so that the bumper is difficult then to remove.

In specifically preferred embodiments the rubber of the corner member is on the order of 75 durometer and separate legs are provided between which extend reinforcements serving to make it a secure fit. While the reinforcements may be of bridge form, instead a solid section of rubber can be employed in certain instances.

For insertion a regular screw driver may be employed. One leg of the corner member can first be inserted and the screwdriver is then used to compress the other leg to slip it in.

During mass production, the use of a special tool and lubricant are feasible, but are not necessary. Welding the returning flanges in the lower edge serves to strengthen the shelf particularly when made of thin sheet metal stock. This weld provides a physical joint of metal-to-metal and results in a very strong shelf construction. It is not necessary for the operation of the fitting of the corner bumper or the function of the corner bumper, but preferable for strength. For a lighter duty, less expensive product, this feature may be omitted.

In the drawings

FIG. 1 is a perspective view of a corner portion of a shelf according to the invention;

FIG. 2 is a cross-sectional view taken on line 2—2 of FIG. 1;

FIG. 3 is a perspective view from the backside of a corner member according to the invention;

FIG. 4 is a perspective view of an open shelf corner ready to receive the corner member of FIG. 3;

FIG. 5 is a cross sectional view, partially diagrammatic, illustrating the insertion of the corner member;

FIG. 5a shows an alternate form of a corner member;

FIG. 8 is a view similar to FIG. 4 of an open shelf corner,

FIG. 9 is a perspective view of a corner member shaped for insertion therein and FIG. 10 is a cross-section of the two assembled.

Figure 11:
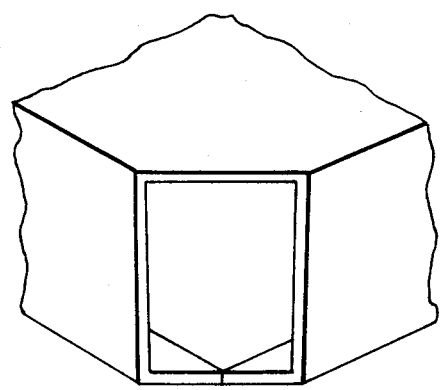
Figure 12:
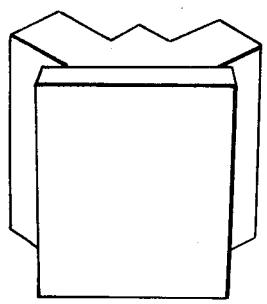
Figure 13:
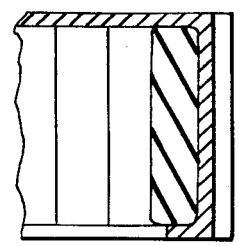
Figure 14:
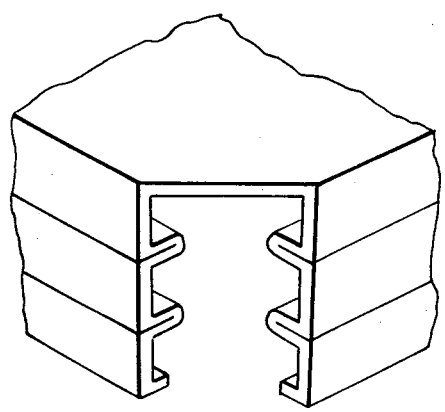
Figure 15:
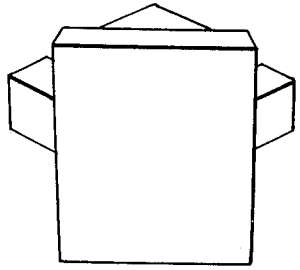
Figure 16:
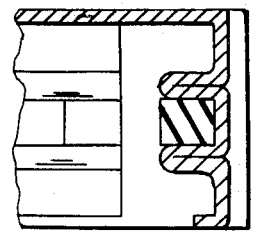
Figure 17:
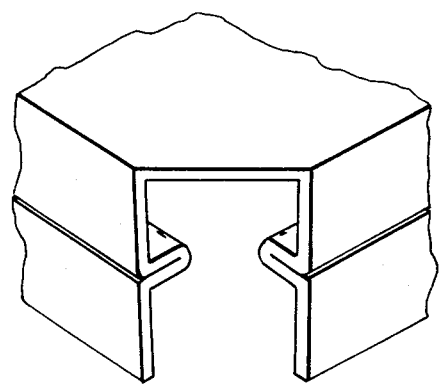
Figure 18:
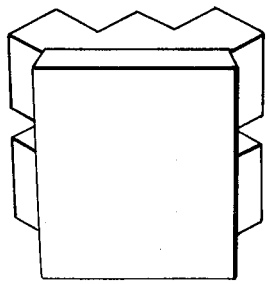
Figure 19:
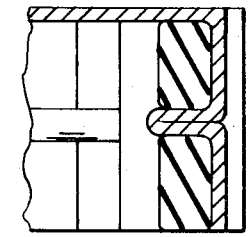

The sets of FIGS. 11, 12 and 13; 14, 15 and 16; and 17, 18 and 19 are views similar to the set of FIGS. 8, 9 and 10 of other preferred embodiments.

Figure 7:
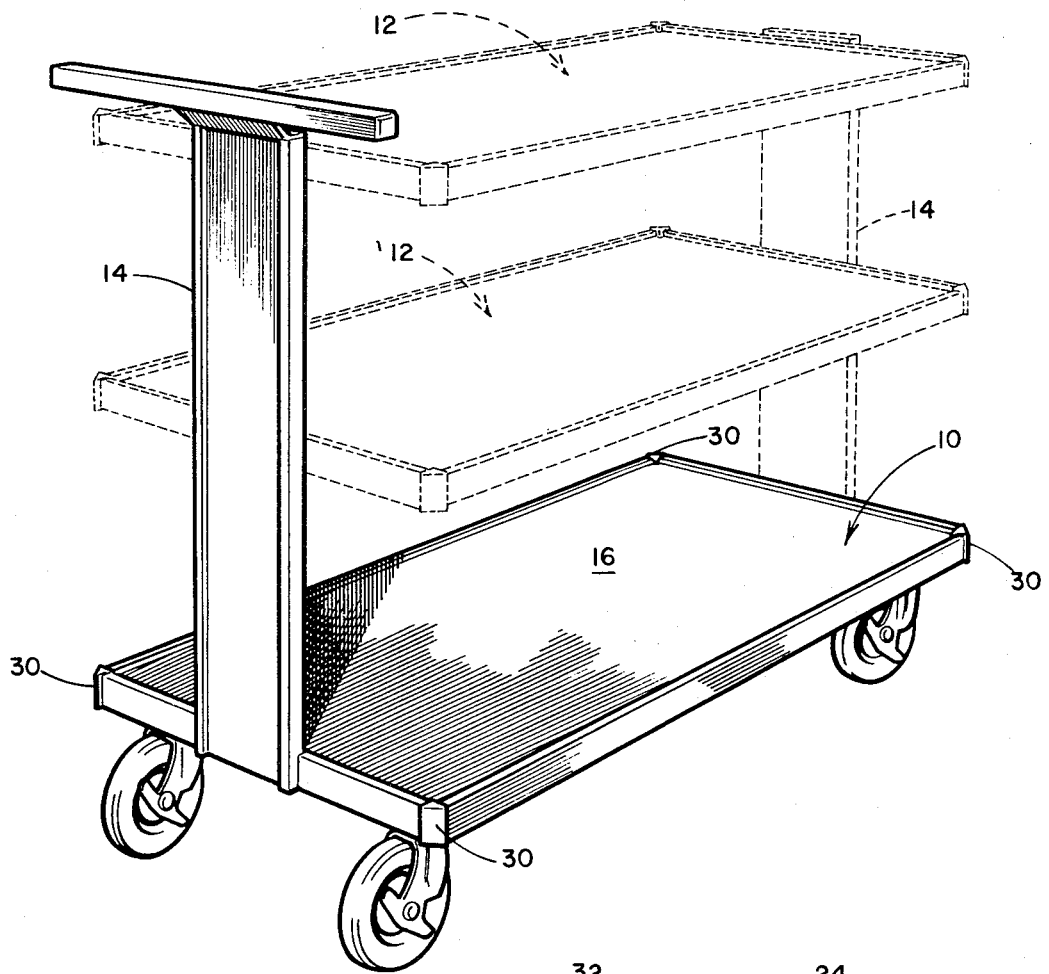
FIG. 7 is a perspective view of a food service cart constructed according to the invention.
Figure 6:
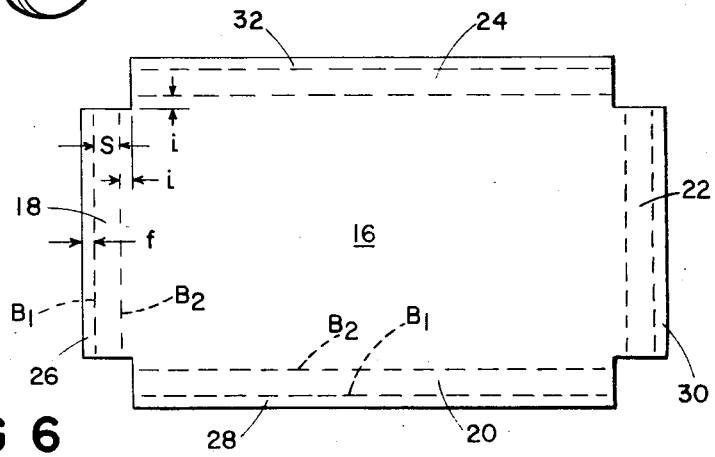
FIG. 6 is a plan view of a sheet of metal from which the top may be formed.
Figure 20:
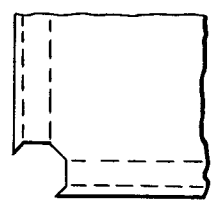

FIG. 20 is a plan view of a top, similar to FIG. 6, of the embodiment of FIG. 11.

Referring to FIGS. 1–7 a shelf 10 is mounted with other shelves 12 to end supports 14 to form a portable cart. Shelf 10 comprises an integral, e.g. stainless steel sheet, formed to provide horizontal top 16, side skirts 18, 20, 22, 24 and bottom flanges 26, 28, 30 and 32. All corners of the shelf are of the same construction.

Referring to FIG. 4, the skirts 18 and 20 are foreshortened in the corner region, relative to their projected line of intersection L, providing an open corner. In this embodiment the lower flanges 26, 28 which extend horizontally inwardly from the lower edges of the skirts are similarly foreshortened, their extreme inner corners however nearly touching and being joined together by a small but strong stainless steel arc weld 31. As can be seen in FIG. 4 the side skirts 18, 20, the respective flanges 26, 28 and the portions of the undersurface of the top opposed to the flanges form a pair of "C" cross-section horizontal channels set at 90° to each other but interrupted at the projected area of intersection. The top also has a square notch in the corner region having the dimension i on each side.

Referring to FIG. 6 the sheet of stainless steel from which the shelf is formed begins as a rectangle. It is first notched at the corners with square notches having a depth of $(f+s+i)$, $f$ being the width of each flange, s the width of the side skirts and $i$, as mentioned, the width of the notch in the top. The sheet of metal is then appropriately bent along lines $B_1$, $B_2$ to provide the form shown in FIG. 4.

The elastomeric corner member 30 includes an elastomeric outer bumper member, here shown as a plate 32 formed to provide a 45° chamfered end to the shelf.

A pair of vertical side surfaces 34, 36 project inwardly from the plate 32, at 45° angles to the plane of the plate and at 90° to each other, as shown these surfaces butting against the ends of the side skirts 18 and 20 respectively. The distance 0 between the ends of the side skirts corresponds substantially to the width of the corner member 30 in the same region.

At a point spaced inwardly, the corner member defines leg surfaces 38, 40, these surfaces being vertical, extending substantially at right angles to the respective side surfaces 34 and 36, and protruding horizontally along the respective side skirts. In this embodiment the leg surfaces are defined by a pair of leg members 42, 44, and projections 34a, 36a of the side surfaces 34, 36, extend inwardly beyond the leg members, defining a triangular solid. The leg members are stiffened by braces 46, 48 extending inwardly to the solid.

The plate 32 and the triangular solid defined by surfaces 34, 36, and 34a, 36a, extend upwardly beyond the upper extent of the leg members 42, 44, a distance z corresponding to the thickness of top 16.

Referring to FIG. 5 the corner member can be inserted by first inserting one of the leg members 42 into its respective channel with the plane of the plate 32 disposed vertically but turned outwardly from its final position, as indicated in dotted lines in FIG. 5. The other leg member 44, is then squeezed inwardly, e.g. by forces applied by a tool, until it is forced past the end of side skirt 18, whereupon the leg 44 snaps into place, the leg surfaces resiliently pressing against the inner surfaces of the respective side skirts; in this final seated position the side surfaces 34, 36 also butt against the ends of the pair of side skirts, and thus the corner member becomes a part of the shelf. The leg members are concealed under the top, as suggested in dotted lines in FIG. 1, while the top 35 of the triangular solid fills the triangular cut-out of the shelf at the corner. The plate 32 protrudes outwardly as a bumper, protecting surrounding objects from damage by the cart and vice versa.

Numerous variations are within the scope of certain features of the invention. For example, the corner member leg surfaces can be formed by a single leg member as shown in FIG. 5a; the top may retain its rectangular form, protected by a protruding bumper 60 (FIGS. 8, 9, 10); the top may be chamfered at 45° (FIGS. 11, 12, 13, 20); the side skirts may include formations which position the portions defining the leg surfaces (FIGS. 14, 15, 16, and FIGS. 17, 18 and 19); and numerous other variations are also possible.

What is claimed is:

1. A movable shelf supported at points spaced from the corners and having a corner defined by an elastomeric corner member, said shelf having a sheet metal top and a pair of integral sheet metal side skirts, one extending along each of two adjacent sides of said top, each side skirt foreshortened, terminating at a position short of the projected intersection of said pair of side skirts whereby said pair defines a corner opening, said elastomeric corner member having a laterally protruding bumper portion at said corner and two positioning leg surfaces, one extending generally parallel to each of said side skirts along the inner surface thereof, the ends of said side skirts and the adjacent edge of said sheet metal top butted against respective surfaces of said elastomeric corner member whereby said corner member effectively finishes the corner region of said shelf and shields said edges.

2. The shelf of claim 1 wherein the portions of said elastomeric corner member defining said leg surfaces are under lateral compression, urging said leg surfaces against the respective inner surfaces of said side skirts.

3. The shelf of claim 1 wherein said sheet is formed to provide a pair or horizontal surfaces along each skirt serving to position said corner member vertically.

4. The shelf of claim 1 wherein there is a cut-out in the corner of said top, said cut-out filled by an upper portion of said elastomeric corner member.

5. In a movable cart comprising at least one shelf supported at points spaced from the corners, wheel structure disposed beneath said shelf and handle means, said shelf comprised of sheet metal defining a top and dependent, integral side skirts, the improvement comprising the combination of an elastomeric bumper member having generally vertical sides and a top surface, said bumper member disposed at and finishing a respective corner of said shelf, the pair of side skirts extending toward the respective corner being foreshortened relative to their projected line of intersection, the ends of said skirts butted against said vertical sides of said bumper member, and said top surface of said bumper member aligned to form effectively an elastomeric continuation of said top surface of said shelf, whereby the corner is completed while metal edges are elastomerically shielded.

6. The movable cart of claim 5 wherein said top surface of said shelf comprises a raised margin portion, said top surface of said bumper member being similarly raised to effectively form the corner of said margins.

7. The movable cart of claim 5 wherein said elastomeric corner member resides in a corner cut-out of said sheet metal top surface, cut edges of the metal sheet defining said upper surface being butted against and shielded by said elastomeric bumper member.

* * * * *